2,809,122
DUAL PURPOSE TINTING BASE

Victor M. Willis and Harvey T. Gehring, Chicago, Ill., assignors to The Sherwin-Williams Company, Cleveland, Ohio, a corporation of Ohio No Drawing. Application June 24, 1954
Serial No. 439,129

14 Claims. (Cl. 106—308)

This invention relates to a pigment-vehicle combination useful as a tinting base to supplant colors-in-oil and additionally useful to color both conventional enamels and water-thinned paints.

Heretofore, in the protective and decorative coatings art it has been customary to supply tubes of colors-in-oil useful in tinting or shading a production color coating over to match the specific color desired by an individual consumer.

With the advent of water-thinned emulsion paints, colors in casein or other water dispersible media have been available to custom-tint production color coatings over to the sought-for custom color of the home decorator.

However, as far as known, there has never been offered a tinting base color which had universal application or dual purpose, that is, could be used to produce an equivalent change of color in both water insoluble solvent thinned enamels as well as in water-thinned emulsion paints. The advantages of such bases are obviously manifold, as can be seen from considering the convenience, economy and adaptability to the needs of the consumer, as well as the curtailed inventory accruing to the advantage of the maker and agencies intermediate the maker and consumer.

This application is a continuation-in-part application of U. S. Serial No. 391,762, filed November 12, 1953.

It is, therefore, an object of this invention to provide a dual purpose tinting base equally useful in coloring both oleoresinous enamels and water-thinned emulsion paints.

A further object of this invention is to provide a series of color bases of uniform quality, equally dispersible in oleoresinous varnishes, oils, enamels, etc., as well as water-thinned emulsion paints, so that coatings of each quality may be tinted or shaded to produce coatings, the dried films of which may be brought to match one another in hue, value and chroma.

Another object of the invention is to provide fluid tinting color bases which, when stirred into either water-insoluble coatings or water-thinned emulsion paints, will disperse readily to produce products of uniform color characteristics, free from blotches, streaks, agglomeration of pigment color and other evidences of heterogeneity of the custom tinted coating composition.

Other objects of the invention will be apparent as the description of the composition and its limitations are developed.

The essential components of the tinting base hereinafter claimed include a water-insoluble pigment, a volatile organic solvent at least a portion of which is soluble in oleoresinous varnishes as well as miscible in water, and a liquid surface active agent at least a minor portion of which is of nonionic classification. The essential components and their quantitative relationships to one another are described in greater detail as follows:

THE PIGMENTARY COMPONENTS

In the production of a series of tinting color bases useful to produce custom colors it is essential to employ a number of pigments of different hue, value and chroma. In colors-in-oil, selection may be very general. In colors-in-casein, due regard must be paid to alkali resistance of the color pigment, for alkaline agents are generally employed to produce the aqueous casein vehicle or carrier for the color pigment. In production of a useful series of dual purpose tinting bases for the purposes of this invention, there are inherent difficulties as well. This is for the reason that some pigments are readily water-wetted and hydrophilic in surface while others are lipophilic and preferentially wetted by oil. From this it can be seen that some pigments have a natural tendency to contribute greater color to a water-thinned emulsion paint than to an oil base paint, or contrariwise, more color to a conventional enamel than an oil-in-water type emulsion paint. Combinations herein disclosed overcome this problem to produce color constancy in each medium.

While it is possible to produce a gamut of tinting colors from pigments other than those herein described and illustrated, the following produce acceptable results in our dual purpose tinting color series and are preferred in producing essential color bases. These include lead chromate yellows, molybdate orange, phthalocyanine blue, lamp black, red iron oxide, low oil absorption value ferrite yellow, iron brown, Permansa green (beta naphthol iron complex) and titanium dioxide.

In order to control the relative strength of the tinting color base varying quantities of inert pigments are co-dispersed in the tinting color. "Inert" is here used in the sense of contributing very little or no color or hiding quality to the base tinting color.

Among the useful inert pigments are china clay, finely divided calcium carbonate and other pigments of water insoluble, chemically inert nature having an average pigment particle size of extremely fine dimension, of the order of 0.1 to 0.5 micron in diameter (as determined by means of an electron microscope by the method of Martins diameters, Chamot & Mason, vol. I). Of these inert pigments, china clay is most economical and imparts favorable dispersion characteristics to the final dual purpose color base. It is, therefore, a favored inert pigment for control of color strength of the tinting base formulas useful for the purposes of this invention.

The percentages of the various components constituting the novel dual purpose tinting bases are not particularly critical. There are, however, ranges of percentages which yield products of maximum utility. To operate outside of these ranges usually introduces problems of color uniformity, viscosity, ease of stirring into coatings to be tinted and problems relating to initial manufacture of the tinting bases themselves.

As to water insoluble pigments present, the total percentage by weight may be varied from about 35% to about 60%. Of this pigment, the percentage of inert is varied as previously observed to hold the color strength of the tinting base color at a desired level.

VOLATILE ORGANIC SOLVENT

To control the fluidity of the tinting color and to provide in part for mutual miscibility of the various color bases in the fluid coating, a volatile organic solvent of polar nature having the capacity to couple between oil and water is essential. Although there are many solvents which are mutually soluble and are useful as couplers in both water and oil, only keto alcohols were found suitable for the ends of the invention here sought. Diacetone alcohol was found to be the most advantageous keto alcohol available. Other materials tested interfered with dispersibility; in some instances when an attempt was made to tint the conventional enamel products, and in other instances when added to the emulsion composition, lack of homogeneity was observed.

With certain pigments, notably phthalocyanine blue and lamp black, replacement of a part of the diacetone alcohol, on the order of from 2% to 50%, with a petroleum distillate such as varnish makers naphtha and mineral spirits overcame a tendency to lack of uniformity when the tinting base was to be used in, for example, an oil modified alkyd varnish containing conventional enamel. In other instances, substitution of part of the diacetone alcohol with mineral spirits provided a less costly but equally serviceable product. However, when the amount of surface active agent in the composition is reduced to a minimum and a blend of two classes of agents are included, as will be seen from what follows, it is preferred to eliminate, or reduce to very small percentages, the quantity of mineral spirits in the volatile organic solvent portion of the composition.

The keto alcohol solvent will account for from 15 to about 50% of the total composition by weight and a preferable range is from 30 to about 45%. Depending upon other variables in the composition of the base, the amount of substitution of petroleum hydrocarbon solvent may vary from none to as high as 50% of the total volatile solvent present in the composition.

SURFACE ACTIVE AGENTS

Selection of the surface active agents capable of functioning in dual capacity in the combination to produce a universal tinting base is the most critical part of the present formulation. Superficially, it might be anticipated that any surface active agent of the many thousands available would be useful. However, considerable research was essential to discover a class of agents which would provide a tinting base satisfactory for the ends of this invention. As is well known, emulsifying and wetting agents possess both oil soluble or lipophilic groups and water soluble or hydrophilic groups. The hydrophile-lipophile balance is important in this application.

Broadly, surface active agents may be placed in one of three categories, the names of which are derived from their functional behavior. These are known as anionic, nonionic and cationic classes. The anionic group constitutes the largest class and includes those of greatest variety which are the alkaline soaps or salts of acidic organic compounds containing at least 8 carbon atoms in the lipophilic group. Of this entire class, none are known to be useful alone for the purposes of this invention. Of the cationic class, none are useful. One specific subclass of the nonionic class has been found essential. The subclass of nonionics includes the group consisting of alkyl polyoxyalkalene ethanols and propanols and alkyl phenoxy polyoxyalkylene ethanols and propanols wherein the alkyl group is a $C_4$ to $C_{10}$ carbon chain and the polyoxyalkylene groups number from eight to fifty and are in turn selected from the group consisting of ethylene and propylene oxide adducts. Molecular weights of the useful surface active agents for our purposes may be varied from about 550 to not more than about 3000, depending in part upon the presence or absence of the aryl group in the surface active agent molecule. The group containing the aryl nucleus has some elements of superiority, and is to be preferred, however.

A number of agents of the essential class, as above described, are available commercially and solid under a variety of trade names. They include "Antarox A–400," a nonyl phenoxy polyethanoxy ethanol; "Triton X-100," "Emulphor DDT" and "Igepal C–A extra" which are understood to be octyl phenoxy polyethanoxy ethanols wherein the number of polyethanoxy groups approximates 10. Where the agent includes an aryl group the molecular weights are generally less than in the purely aliphatic members of the class. The purely aliphatic variety of nonionic agent is illustrated by "Tergitol XC" which is identified as the monobutyl ether of polypropylene glycol of molecular weight of 1400, reacted with a sufficient quantity of ethylene oxide to bring the final molecular weight to about 2800. This product is also referred to as a monobutyl ether of polyoxyalkanoxy ethanol of molecular weight about 2800, and more generically as an alkyl polyoxyalkylene ethanol wherein the alkyl group is a $C_4$ to $C_{10}$ carbon chain, and the polyoxyalkylene portions of the molecule are selected from the group consisting of ethylene and propylene oxide adducts. These agents are readily soluble in water. In practical experience the nonionic agents containing the phenoxy (aryl) group show up consistently well, and are preferred over the straight aliphatic varieties. This for the reason that color tinting bases utilizing them are of superior quality, are more stable after long storage and give custom colors of more consistent uniformity when the bases containing them are admixed in quantities of from one to four ounces of tinting color per gallon of paint. As stated, the tinting bases are useful in oil-thinned enamels as well as water-thinned emulsion paints.

The above described variety of nonionic agent may be prepared by condensing a plural number of alkylene oxide groups with an alkyl phenol, e. g., nonyl phenol; or an aliphatic alcohol, ether alcohol or polyalkylene glycol as the case may be.

Recent research has shown it possible to replace a portion, but not all, of the nonionic surface active agent described above with a specific class of anionic agent. This group is known broadly under the label of alkyl aryl sulfonates but that very broad class includes inoperative varieties for the purposes of this invention. Those useful here are not soluble in water, but only dispersible therein and are liquids not solids.

The operative alkyl aryl sulfonates are limited to alkyl benzene and alkyl naphthalene sulfonic acid amine salts wherein the alkyl substituents of the benzene and naphthalene number from 1 to 3 and contain from three to twelve carbon atoms in the case of benzene and from one to four carbon atoms in the case of naphthalene depending, of course, upon the number of substituents. The amine used to form the salt may be either an aliphatic or cyclic amine containing from one to six carbon atoms.

The operative alkyl aryl sulfonates above described may be prepared by alkylation of benzene or naphthalene, or by alkylation of coal tar fractions containing alpha methyl naphthalene, etc., with alkyl groups or substituents as hereinbefore described, sulfonating the alkylate and neutralizing the sulfonic acid group with a water soluble amine, including as illustrative, ethyl amine, dimethyl amine, isopropyl amine, cyclohexyl amine, etc., to yield a fluid product which is colloidally dispersible in water. Illustrative products useful are Atlas G–3300 (a product of Atlas Powder Company) identified as the isopropyl amine salt of dodecyl benzene sulfonate and the cyclohexyl amine salt of isopropyl naphthalene sulfonate.

These products are hereinafter referred to generically as water soluble amine salts of alkyl aryl sulfonates wherein the amine contains not more than six carbon atoms and the molecular weight is between 300 and 450. More specifically, the useful members of the alkyl aryl sulfonates may be represented by the formula:

$$Y_xRSO_3M$$

where R is an aryl nucleus selected from the group consisting of benzene and naphthalene, Y is an alkyl group containing from 1–3 carbon atoms when R is naphthalene and 3–12 carbon atoms when R is benzene, M is an aliphatic or cyclic water soluble amine residue containing not more than 6 carbon atoms, $x$ is a whole number from 1–3 and the molecular weight of the compound is not less than about 300 and less than 450.

While, as previously indicated, partial replacement of the nonionic surface active agent with the variety of alkyl aryl sulfonates defined supra is not essential, but to do so improves the product tinting colors. Improvement is observed in the quality of the color resulting when the tinting base is used to make a custom color with outside house paint as the coating material, for example. Where the vehicle is predominantly a straight drying oil, such as linseed oil, the anionic inclusion is of particular value. Also there is some advantageous cost reduction, for in general the nonionic agents suitable for the purposes of the invention are more costly than the class of anionic agents described as useful for partial substitution therefor.

Having described the nature of the two classes of surface active agents and their limitations in the dual tinting base, it is clear that in certain instances the surface active agent may be 100% of the defined nonionic class. However, the total of the surface active agent present in the composition may be varied from 5% to about 20% by weight of the total base as a preferred range, and from about 5% to as high as 30% by weight as a broad range. The percentages employed depend in great measure upon the surface characteristics of the pigment. If the described class of anionic agent is employed as a substitute for part of the essential nonionic surface active agent, up to 90% of the total surface active agent may be substituted for with the alkylamine salt of an alkyl aryl sulfonate of the quality as discussed above, however 85% is a preferred upper limitation upon the substitution.

The following examples are illustrative of various forms of the invention:

*Example I*

415 parts lemon chrome yellow
225 parts china clay
200 parts isoctyl phenoxyl polyglycol ether (Igepal C-A extra)
100 parts mineral spirits
250 parts diacetone alcohol were mixed together and milled in a ball mill to an enamel fineness (6+ Hegman gauge). Thereafter the ground material was emptied into a receiving vessel and the mill washed with an additional 100 parts diacetone alcohol. Yield of 100 gallons of tinting base having a weight per gallon of 12.70 pounds.

*Example II*

175 parts molybdate orange
300 parts china clay
200 parts isoctyl phenoxy polyglycol ether
100 parts mineral spirits
265 parts diacetone alcohol were milled together in a ball mill as in Example I. Upon reaching a 6+ Hegman gauge grind the mill was emptied into a receiving vessel and washed with an additional 100 parts diacetone alcohol to remove paste held by the mill. Yield of 100 gallons; weight per gallon of 11.76 pounds.

*Example III*

26 parts copper phthalocyanine blue
4 parts red iron oxide
500 parts china clay
200 parts nonyl phenoxy polyoxy ethylene ethanol (Antarox A-400)
100 parts mineral spirits
215 parts diacetone alcohol (acetone free)

The above mixture was milled in a ball mill to a 6 + fineness (Hegman gauge) and dumped into a receiving vessel.

100 parts additional of diacetone alcohol were added and employed to clean out the residue left in the mill. Yield of 100 gallons; weight per gallon of 11.10 pounds.

*Example IV*

85 parts lamp black (Columbia carbon #30)
5 parts phthalocyanine blue
500 parts china clay
200 parts octyl phenoxy polyoxy ethylene ethanol
100 parts solvent naphtha
160 parts diacetone alcohol were milled as in the previous example.

100 parts diacetone alcohol were used after removing the mill charge to dilute and remove residual material in the mill. The washings were added to the recovered mill charge. Yield of 100 gallons; weight per gallon of 11.20 pounds.

*Example V*

390 parts red iron oxide low oil absorption (synthetic quality)
20 parts light chrome yellow
200 parts china clay
60 parts isooctyl phenoxy polyoxy ethylene ethanol
150 parts mineral spirits
350 parts diacetone alcohol The mill charge above was ground as in the prior examples to a 6+ grind gauge fineness and the mill cleaned by rinsing with 100 parts additional of diacetone alcohol which rinsings were included with the main mill charge. Yield of 100 gallons; weight per gallon of 12.30 pounds.

This example is representative of a minimum quantity of nonionic agent useful for the purposes of the invention.

*Example VI*

150 parts ferrite yellow (low oil absorption)
150 parts red iron oxide
200 parts china clay
200 parts monobutyl ether of polyoxy propylene-polyoxyethylene ethanol (Tergitol XC)
100 parts mineral spirits
256 parts diacetone alcohol After milling in a ball mill to the requisite fineness as in previous examples, the mill charge and the washings from the mill including an added 100 parts of diacetone alcohol were combined to yield 100 gallons of tinting base weighing 11.33 pounds per gallon.

*Example VII*

175 parts molybdate orange
300 parts china clay
50 parts isopropylamine salt of diisopropyl naphthalene sulfonic acid
10 parts octyl phenoxy polyoxy ethylene ethanol
446 parts diacetone alcohol The above materials were ball milled as in the prior examples and the mill rinsed out after unloading with 166 parts of additional diacetone alcohol which washings were later added to the main batch to yield 100 gallons of tinting base.

Tinting bases may also be prepared utilizing other water insoluble colored pigments including low oil absorption ferrite yellow, Permansa green (beta naphthol iron complex), etc. As indicated before, the quantity or percentage of color is dependent to some extent upon the tinting strength of the prime color chosen and the tinting strength of other color bases in the line.

It has been observed that certain alkaline pigments apparently tend to cause alkaline decomposition of diacetone alcohol to form acetone. As acetone has an objectionably low flash point and warning notice is required in the labeling of packages containing this low boiling solvent, it has been found desirable to include a minor proportion of an acidic buffer which will hold the composition at a pH of from about 5 to 7. While other buffers are useful, citric acid has been found advantageous to accomplish this end.

The volatile nature of certain of the tinting base components indicates a ball mill to be a preferred piece of equipment to produce the fineness of subdivision and dispersion sought for. Obviously, other means of dispersion may be employed with more or less success.

Bases illustrated in the previously set out examples were admixed for test purposes in an oil modified glycerophthalate containing enamel sold under the trade name of "Kem Glo" and a latex based oil-in-water type emulsion paint sold under the trade name of "Super Kem-Tone" in amounts varying from ½ ounce to 4 ounces per gallon of paint. Where the amount added to each quality of coating was carefully controlled, the colors made matched very closely in both the oil-modified alkyd enamel as well as the water-thinned emulsion paint. The colors dispersed readily in both the oleoresinous vehicle as well as the water-thinned emulsion paint without leaving any lack of uniformity in the test panels coated with the custom-tinted coatings.

Many other nonionic agents of varying chemical composition have been experimentally tested in attempts to formulate a shading base useful for the purposes of this invention. Results of efforts to use the experimental bases in both an oil base and a water-thinned paint were not successful, usually for the reason that color development in one instance was not uniform.

Uniformity of color development is an essential, for one of the principal purposes of the invention is to color both an enamel (as adapted for woodwork, etc.) and an oil-in-water emulsion paint (popularly used in painting wall areas) to match one another in accordance with the mode of the day. As walls and woodwork abut one another, slight variations in color are readily detected and are a basis for consumer objection. Hence consumer acceptance of tinting colors for the purposes herein set out requires a tinting base yielding no noticeable color differences when added to available coatings of both the conventional oil and oleoresinous class as well as the emulsion class.

The term oleoresinous is here used as defined by Mattiello, vol. 3, of Protective and Decorative Coatings, page 195.

Having thus described and illustrated an improved dual purpose tinting base composition, what we claim is:

1. A tinting base for use in decorative coatings which comprises in combination from 35% to 60% by weight of a water insoluble pigment, from 5 to 30% by weight of a nonionic surface active agent selected from the class consisting of alkyl polyoxyalkylene ethanols and alkyl phenoxy polyoxyalkylene ethanols wherein the alkyl group is a $C_4$ to $C_{10}$ hydrocarbon, the polyoxyalkylene groups number from 8 to 50 and are in turn selected from the group consisting of ethylene and propylene oxide adducts, and from 15 to 50% by weight of diacetone alcohol.

2. As in claim 1, wherein the nonionic surface active agent is the monobutyl ether of polypropylene glycol of average molecular weight of 1400 further condensed with ethylene oxide to an average molecular weight of about 2800.

3. As in claim 1, wherein the nonionic surface active agent is a $C_8$ to $C_{10}$ alkyl substituted phenoxy polyoxyethylene ethanol of average molecular weight within the range of not less than 550 and not more than 3000.

4. As in claim 1, wherein the nonionic surface active agent is an octyl phenoxy polyoxyethylene ethanol of average molecular weight of from 550 to not more than about 800.

5. A universal tinting base dispersible in oleoresinous enamels, oil paints and oil-in-water emulsion paints which comprises in combination from 35% to 60% by weight of a water insoluble pigment; a total of from 5 to 30% by weight of each of two surface active agents, the essential agent being of the nonionic class and selected from the group consisting of alkyl polyoxyalkylene ethanols and alkyl phenoxy polyoxyalkylene ethanols wherein the alkyl group is a $C_4$ to $C_{10}$ hydrocarbon, the polyoxyalkylene groups number from 8 to 50 selected from the group consisting of ethylene and propylene oxide adducts; the ancillary surface active agent is an alkyl benzene sulfonic acid alkylamine salt wherein the alkyl substituents of the benzene nucleus number from 1 to 3, contain from three to not more than about twelve carbon atoms each, the alkylamine residue contains not more than about six carbon atoms wherein said anionic agent is not more than 90% of the total surface active agent present; and from 15 to 50% by weight of diacetone alcohol.

6. A universal tinting base dispersible in oleoresinous enamels, oil paints and oil-in-water emulsion paints which comprises in combination from 35% to 60% by weight of a water insoluble pigment; a total of from 5 to 30% by weight of each of two surface active agents, the essential one being a nonionic agent selected from the class consisting of alkyl polyoxyalkylene ethanols and alkyl phenoxy polyoxyalkylene ethanols wherein the alkyl group is a $C_4$ to $C_{10}$ hydrocarbon, the polyoxyalkylene groups number from 8 to 50 and are selected from the group consisting of ethylene and propylene oxide adducts; the ancillary surface active agent is an alkyl naphthalene sulfonic acid alkylamine salt wherein the alkyl substituents of the naphthalene nucleus number from 1 to 3, contain from one to not more than four carbon atoms each, the alkyl groups of the alkylamine contains not more than about six carbon atoms and said anionic agent is not more than 90% of the total surface active agent present; and from 15 to 50% by weight of diacetone alcohol.

7. As in claim 6, wherein the nonionic surface active agent is the monobutyl ether of polypropylene glycol of average molecular weight of 1400 further condensed with ethylene oxide to an average molecular weight of about 2800.

8. As in claim 6, wherein the nonionic surface active agent is a $C_8$ to $C_{10}$ alkyl substituted phenoxy polyoxyethylene ethanol of average molecular weight of a range of from 550 and to not more than about 3000.

9. As in claim 6, wherein the nonionic surface active agent is an octyl phenoxy polyoxyethylene ethanol of average molecular weight of from 550 to not more than about 800.

10. A universal tinting base dispersible in oleoresinous enamels, oil paints and oil-in-water emulsion paints which comprises in combination from 35 to 60% by weight of a water insoluble pigment; from 5 to 20% by weight of each of two surface active agents, the essential one being a nonionic agent selected from the class consisting of alkyl polyoxyalkylene ethanols and alkyl phenoxy polyoxyalkylene ethanols wherein the alkyl group is a $C_4$ to $C_{10}$ hydrocarbon, the polyoxyalkylene groups number from 8 to 50 and are selected from the group consisting of ethylene and propylene oxide adducts; the ancillary surface active agent is an alkyl aryl sulfonic acid salt of the formula $$Y_xRSO_3M$$

where R is an aryl nucleus selected from the group consisting of benzene and naphthalene, Y is an alkyl group containing from 1–3 carbon atoms when R is naphthalene and 3–12 carbon atoms when R is benzene, M is selected from the group consisting of aliphatic and cyclic water soluble amine residues containing not more than six carbon atoms, $x$ is a whole number from 1–3 and the molecular weight of the compound is not less than about 300 and less than 450; and said ancillary anionic surface active agent is not more than about 85% of the total surface active agent composition and from 30 to 45% by weight of diacetone alcohol.

11. As in claim 10, wherein the ancillary surface active agent is an amine salt of an alkyl benzene sulfonic acid wherein the alkyl substituent group of the benzene nucleus contains not more than about twelve carbon atoms.

12. As in claim 10, wherein the nonionic surface active agent is an alkyl phenoxy polyoxyalkylene ethanol of average molecular weight from 550 to not more than about 800, the alkyl group is a $C_4$ to $C_{10}$ hydrocarbon and the polyoxyalkylene group is an ethylene oxide adduct.

13. As in claim 10, wherein the nonionic surface active agent is an octyl phenoxy polyoxyethylene ethanol of average molecular weight of from 550 to not more than about 800 and the ancillary surface active agent is the dodecyl benzene sulfonic acid salt of an amine containing from one to six carbon atoms.

14. As in claim 10, wherein the nonionic surface active agent is nonyl phenoxy polyoxypropylene ethanol having a molecular weight of from 550 to 800 and the ancillary anionic surface active agent is the cyclohexyl amine salt of dodecyl benzene sulfonic acid.

References Cited in the file of this patent

UNITED STATES PATENTS

| | | |
|---|---|---|
| 2,213,477 | Balle et al. | Sept. 3, 1940 |
| 2,430,828 | Schmidt | Nov. 11, 1947 |
| 2,582,868 | Hausmann et al. | Jan. 15, 1952 |
| 2,597,863 | Greubel | Jan. 15, 1952 |
| 2,617,740 | Morris | Nov. 11, 1952 |
| 2,623,027 | Deniston et al. | Dec. 23, 1952 |
| 2,657,148 | Ehrlich | Oct. 27, 1953 |

FOREIGN PATENTS

| | | |
|---|---|---|
| 470,181 | Great Britain | Dec. 31, 1936 |

OTHER REFERENCES

Article on "Continuous Film Producing Emulsion Paints" by Stieg, found on pages 9, 24, 26 and 28 of Paint, Oil and Chemical Review, June 28, 1945.